United States Patent

Newstead et al.

[11] Patent Number: 5,852,483
[45] Date of Patent: Dec. 22, 1998

[54] BACK ILLUMINATED LCD APPARATUS WITH LIGHT ATTENUATING MEANS FOR EVEN LIGHT DISTRIBUTION AND METHOD OF MANUFACTURE

[75] Inventors: Robert Clifford Newstead; Peter Michael Peregrine, both of Surrey, England

[73] Assignee: Nokia Mobile Phones, Ltd., Camberley, United Kingdom

[21] Appl. No.: 574,603

[22] Filed: Dec. 18, 1995

[30] Foreign Application Priority Data

Dec. 23, 1994 [GB] United Kingdom .................. 9426468

[51] Int. Cl.$^6$ .................................................. G02F 1/1335
[52] U.S. Cl. ................................ 349/62; 349/64; 349/61; 349/65; 362/293; 362/31
[58] Field of Search ................................ 349/61, 62, 64, 349/65; 362/293, 31

[56] References Cited

U.S. PATENT DOCUMENTS

| | | | |
|---|---|---|---|
| 4,673,254 | 6/1987 | Kato et al. | 350/345 |
| 5,016,002 | 5/1991 | Levanto | 340/756 |
| 5,134,549 | 7/1992 | Yokoyam | 362/31 |
| 5,384,658 | 1/1995 | Ohtake et al. | 359/707 |
| 5,600,462 | 2/1997 | Suzuki et al. | 349/112 |

FOREIGN PATENT DOCUMENTS

| | | |
|---|---|---|
| 0462361 | 12/1991 | European Pat. Off. . |
| 0 571 173 | 11/1993 | European Pat. Off. . |
| 0592241 | 4/1994 | European Pat. Off. . |
| 2267378 | 12/1993 | United Kingdom . |

*Primary Examiner*—William L. Sikes
*Assistant Examiner*—Julie Ngo
*Attorney, Agent, or Firm*—Perman & Green, LLP

[57] ABSTRACT

An improved illuminated LCD apparatus of the type comprising a PCB (7;10) upon which are mounted a liquid crystal display (1), at least one light source (3), a light guide (2) disposed between the liquid crystal display and the substrate for distributing light from the light source over an area of the liquid crystal display, and light attenuating means (5;18,20) disposed between the light guide and the substrate and comprising a pattern of areas of differing optical reflectance for reducing the intensity of the light reaching portions of the liquid crystal display nearest to the light source. The improvement comprises the light attenuating pattern being printed directly onto the substrate, thereby improving the efficiency and accuracy with which the pattern is applied. The light attenuating pattern may include elements formed as part of the usual PCB production process.

14 Claims, 2 Drawing Sheets

BACK ILLUMINATED LCD APPARATUS WITH LIGHT ATTENUATING MEANS FOR EVEN LIGHT DISTRIBUTION AND METHOD OF MANUFACTURE

BACKGROUND OF THE INVENTION

This invention relates to an illuminated liquid crystal display (LCD) apparatus and a method of manufacturing such apparatus, and more particularly to a liquid crystal display which is illuminated from behind.

It is common practice to use a light guide (or "light-pipe") behind an LCD to distribute light from one or more light sources, such as light emitting diodes (LED's). The light guide generally comprises a plate-like member, the LED's being located in recesses at the side faces of the light guide. Light enters the light guide through the side faces and is distributed through the light guide by internal reflection. The front face of the light guide may be "roughened" to make it lossy so that light escapes into the LCD. The light guide thus acts to distribute light over a wide area of the LCD.

However, when relatively few light sources are used, there is a tendency for the illumination to be uneven over the whole area of the LCD. Generally, the light is more intense nearer to the LED's and less intense further away.

EP-A-0 571 173 discloses a solution to this problem of uneven light distribution by the provision of light attenuating means, in the form of a pattern of dots, disposed adjacent the light guide and arranged to reduce the intensity of the light reaching those portions of the LCD nearest to the light source. FIGS. 1 to 3 of the accompanying drawings illustrate LCD apparatus and light attenuating means as disclosed in EP-A-0 571 173.

As seen in FIGS. 1 and 2, the apparatus comprises a liquid crystal display 1 behind which is mounted a flat, plate-like light guide 2 (typically of acrylic). A number of light emitting diodes (LED's) 3 are provided along opposing side faces of the light guide 2 for injecting light into the light guide. The two sets of LED's 3 are located in respective recesses 4 at the sides of the light guide 2.

The light attenuating means 5 is disposed beneath the light guide 2, and may comprise a thin sheet of reflective material such as white paper, on which is printed in black ink a pattern of dots 6 as shown in FIG. 3. The pattern of dots 6 includes two half-ellipse shapes extending from respective edges of the attenuation means 5 adjacent the rows of LED's 3. The assembly is mounted on a substrate 7 such as a printed circuit board (PCB).

The dot patterns 6 reduce the overall level of reflection from the back face of the light guide 2 within the two half-elliptical areas. This has the effect of attenuating the amount of light which escapes from the light guide 2 into the LCD 1 at the corresponding areas. Accordingly, a more uniform illumination can be achieved over the whole area of the LCD. The pattern of dots 6 can be varied in size, shape, density or location to suit different arrangements of light sources. The density of the dots might also be varied within the pattern to provide a graduated distribution. Reference is made to EP-A-0 571 173 for further details of these aspects.

EP-A-0 571 173 suggests that the light attenuating means 5 be provided as a separate sheet having the dots 6 printed upon it, or may be coated onto the surface of the light guide. In practice, the light attenuating means 5 has been provided in the form of a self-adhesive paper label, having a white background upon which the light attenuating pattern is printed. The label is applied to the surface of the substrate 7 prior to installation of the light guide 2 and LCD 1. This arrangement is not entirely satisfactory, since the application of the labels is time-consuming and because relatively slight mis-alignment of the label on the substrate can result in poor light distribution in the finished article.

SUMMARY OF THE INVENTION

In accordance with a first aspect of the present invention there is provided an illuminated liquid crystal display apparatus comprising a substrate having mounted thereon:

a liquid crystal display;

at least one light source;

a light guide comprising a transparent plate-like member having front, back and side faces and being disposed between the liquid crystal display and said substrate for distributing light from said at least one light source over an area of the liquid crystal display; and light attenuating means disposed between said light guide and said substrate and comprising a pattern of areas of differing optical reflectance for reducing the intensity of the light reaching portions of the liquid crystal display nearest to the light source;

wherein said light attenuating means is printed on said substrate.

In accordance with a second aspect of the present invention there is provided a method of providing light attenuating means in an illuminated liquid crystal display apparatus, said liquid crystal display apparatus comprising:

a substrate having mounted thereon a liquid crystal display; at least one light source; a light guide comprising a transparent plate-like member having front, back and side faces and being disposed between the liquid crystal display and said substrate for distributing light from said at least one light source over an area of the liquid crystal display; and light attenuating means disposed between said light guide and said substrate and comprising a pattern of areas of differing optical reflectance for reducing the intensity of the light reaching portions of the liquid crystal display nearest to the light source;

wherein said light attenuating means is formed by printing said light attenuating pattern directly on said substrate.

In the case of both the first and second aspects of the invention, the light attenuating means may include a first background layer printed on said substrate. The background layer may comprise an opaque solder resist material substantially covering the substrate.

The light attenuating means may further include a plated copper pad located adjacent the position of each light source on the substrate, the plated pad having an optical reflectance less than that of the background layer.

The light attenuating means may also include at least a second layer printed on top of said first layer to define areas of differing optical reflectance. Where copper pads are employed as part of the light attenuating pattern, the second layer may be printed on top of the copper pads and on top of part of said background layer adjacent the pads. The second layer may suitably comprise a pattern of dots.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
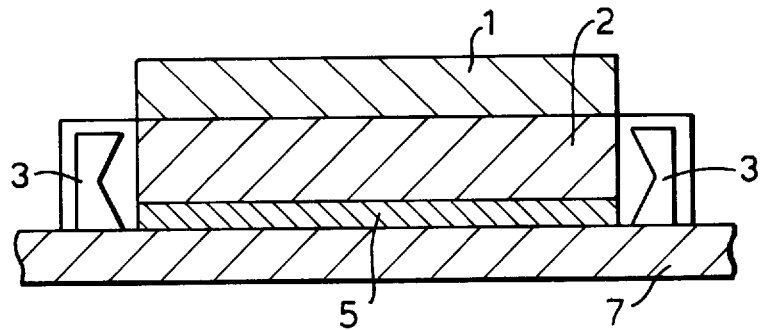
FIG. 1 is a schematic cross-section of a prior art liquid crystal display apparatus.
Figure 2:
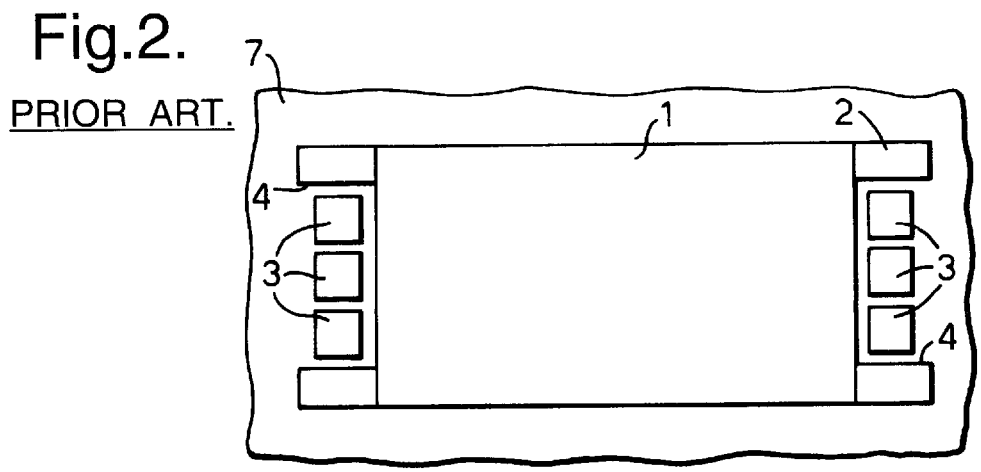
FIG. 2 is a plan view of the liquid crystal display apparatus of FIG. 1.
Figure 3:
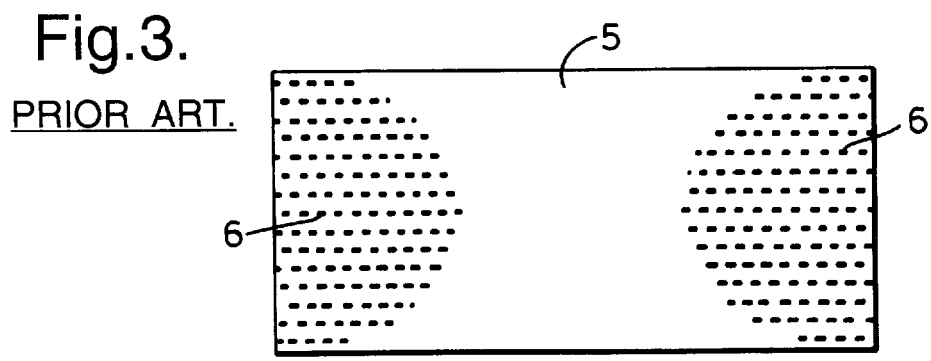
FIG. 3 is a plan view of a light attenuating member for use in the liquid crystal display apparatus of FIGS. 1 and 2.

The liquid crystal display apparatus provided by the present invention corresponds generally to the prior art apparatus illustrated in FIGS. 1 and 2, and will not be described in detail herein. It will be understood that the general configuration of the LCD 1 and the number, arrangement and type of the light sources 3 may vary according to need. It will also be appreciated that the relative thickness of the light attenuating member 5 is greatly exaggerated in FIG. 1.

In accordance with the present invention, the light attenuating member 5 is provided by printing a background layer (normally white in colour) having a substantially uniform optical reflectance on the substrate 7 and overprinting the light attenuating pattern 6 on top of the background layer. This printing may suitably be carried out as part of the process of manufacturing the substrate, prior to installation of components thereon. The printing may be carried out by any suitable process such as silkscreen printing, and may be performed by automated apparatus (as is well known in the art) so as to ensure accurate positioning of the light attenuating means 5. Accordingly, the formation of the light attenuating means may be automated and integrated into the substrate manufacturing process.

The variations in reflectance provided by the light attenuating pattern may be obtained by patterns other than, or in addition to, printed dots; for example, by means of larger areas having substantially uniform reflectance but differing from the reflectance of the base layer.

One particular example of light attenuating means formed in accordance with the invention will now be described with reference to FIGS. 4 and 5.

Figure 4:
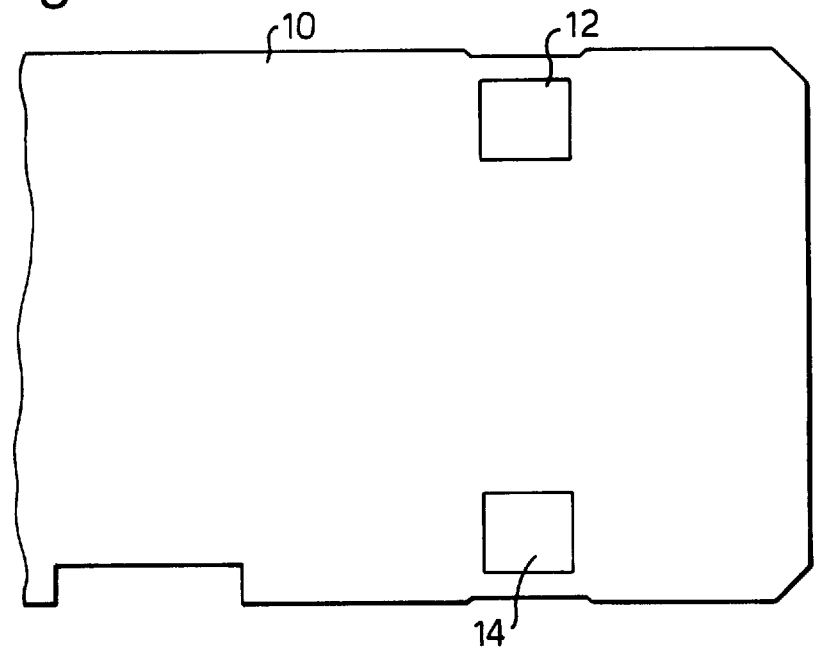
FIG. 4 is a schematic plan view of part of a printed circuit board upon which liquid crystal display means may be mounted in accordance with the present invention.
Figure 5:
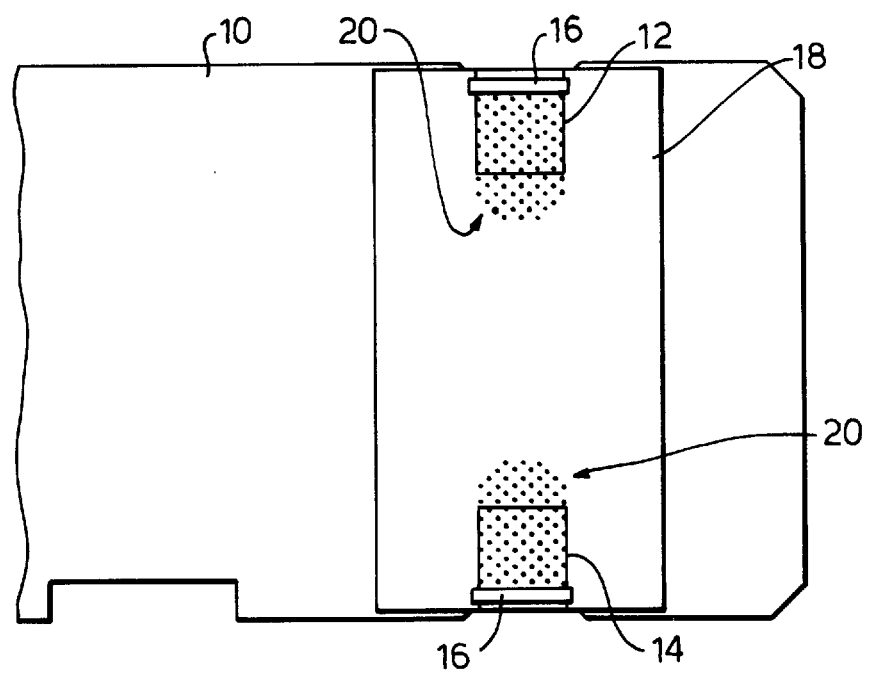
FIG. 5 is a view similar to FIG. 4 after the application of light attenuating means to the printed circuit board in accordance with the present invention.

FIG. 4 shows part of a printed circuit board (PCB) 10 corresponding to the substrate 7 of FIGS. 1 and 2. Formed on the surface of the PCB 10 are first and second copper pads 12 and 14 which provide part of the light attenuating pattern. The copper pads 12, 14 may be formed at the same time as the conductive copper tracks (not shown) of the printed circuit, but do not form part of the circuit as such, and are tin/lead plated at the hot air solder level so as to have a metallic grey colour. The pads 12, 14 are located within and adjacent to the side edges of the area which will be covered by the light guide in the assembled apparatus, adjacent the positions 16 (FIG. 5) which will be occupied by the LED's.

The main background area 18 of the light attenuating pattern is silkscreen-printed onto the PCB so as to cover at least the area which will be covered by the light guide, except for the areas occupied by the plated pads 12, 14. If the pads 12, 14 are omitted then the corresponding areas would be covered by the printed background 18. The background area 18 is of substantially uniform optical reflectance, the pads 12, 14 having a reflectance lower than the background 18. The background 18 will normally be white in colour.

The light attenuating pattern is completed by silkscreen-printing the patterns of black dots 20 over the pads 12, 14 and part of the background 18, adjacent the LED positions 16.

The completed light attenuating pattern thus provides areas having three differing aggregate reflectances: the pads 12, 14 overprinted with the dots 20 providing the lowest aggregate reflectance in the areas nearest to the LED positions; the areas of the background 18 overprinted with the dots 20 adjacent the pads 12, 14 providing a medium aggregate reflectance; and the plain background area providing a highest aggregate reflectance.

The light attenuating pattern of FIG. 2 could also be achieved by omitting the copper pads 12, 14 and printing corresponding areas on top of the background layer. However, it is found to be more convenient to form part of the light attenuation pattern by means of copper pads applied during the printing of the printed circuit itself.

Whilst the background layer covers at least that portion of the PCB which will be covered by the light guide, it may cover a larger area or substantially all of the PCB area. PCB's conventionally include a layer of solder resist material, which is commonly of a translucent green colour. The present invention could be implemented by using an opaque solder resist having the required optical reflectance, which would serve as the background layer of the light attenuating pattern. This would eliminate a further process step and the printing of the final dot pattern would be the only step required in addition to the normal PCB process steps, since the copper pads (if used) would be formed and plated as part of the circuit printing process and the background would be formed by application of the solder resist.

It is noted here that in the present context the term "dot" is not restricted to a small circular area and the expression "pattern of dots" is intended to include any discontinuous pattern of recurring features such as dashes, ovals, stars, squares or other shapes.

It will be evident from the foregoing description that various modifications may be made within the scope of the present invention. In particular, as previously noted, the light attenuating pattern may be varied according to need in terms of the size, shape and number of the light attenuating areas of the pattern, and the use of differing shades and/or patterns of dots to achieve the required light distribution, including the use of graduated patterns. Reference is again made to EP-A-0 571 173 for examples of such variations. However, the present invention is not limited to these specific examples.

What is claimed is:

1. An illuminated liquid crystal display apparatus comprising a substrate having mounted thereon:

a liquid crystal display;

at least one light source;

a light guide comprising a transparent plate-like member having front, back and side faces and being disposed between the liquid crystal display and said substrate for distributing light from said at least one light source over an area of the liquid crystal display; and light attenuating means disposed between said light guide and said substrate and comprising a pattern of areas of differing optical reflectance for reducing the intensity of the light reaching portions of the liquid crystal display nearest to the light source;

wherein said light attenuating means includes in part a light attenuating material printed upon said substrate.

2. An illuminated liquid crystal display apparatus as claimed in claim 1, wherein said light attenuating means includes a background layer having an optical reflectance.

3. An illuminated liquid crystal display apparatus as claimed in claim 2, wherein said background layer comprises an opaque solder resist material substantially covering said substrate.

4. An illuminated liquid crystal display apparatus as claimed in claim 2, wherein said light attenuating means further includes a plated copper pad disposed on said substrate and located adjacent the position of each light source, said plated pad having an optical reflectance less than that of the background layer.

5. An illuminated liquid crystal display apparatus as claimed in claim 2 wherein said light attenuating means includes at least a second layer printed on top of said first layer to define areas of differing optical reflectance.

6. An illuminated liquid crystal display apparatus as claimed in claim 2, wherein said light attenuating means further includes a plated copper pad disposed on said substrate and located adjacent the position of each light source said plated pad having an optical reflectance less than that of the background layer and wherein a second layer is printed on top of said copper pad and on top of part of said background layer adjacent said pad.

7. An illuminated liquid crystal display apparatus as claimed in claim 5 wherein said second layer comprises a pattern of dots.

8. A method of providing light attenuating means in an illuminated liquid crystal display apparatus, said liquid crystal display apparatus comprising:

a substrate having mounted thereon a liquid crystal display; at least one light source; a light guide comprising a transparent plate-like member having front, back and side faces and being disposed between the liquid crystal display and said substrate for distributing light from said at least one light source over an area of the liquid crystal display; and light attenuating means disposed between said light guide and said substrate and comprising a pattern of areas of differing optical reflectance for reducing the intensity of the light reaching portions of the liquid crystal display nearest to the light source;

wherein said light attenuating means includes a portion formed by printing a light attenuating material upon said substrate.

9. A method as claimed in claim 8, including the step of printing a first background layer on said substrate.

10. A method as claimed in claim 9, wherein said background layer comprises an opaque solder resist material substantially covering said substrate.

11. A method as claimed in claim 9, further including the step of forming a plated copper pad on said substrate at a location adjacent the position of each light source on the substrate, said pad having an optical reflectance less than that of the background layer.

12. A method as claimed in claim 9, further including the step of printing at least a second layer on top of said background layer after said first background layer is printed to define areas of differing optical reflectance.

13. A method as claimed in claim 12 including the step of forming a plated copper pad on said substrate as part of said first background layer at a location adjacent the position of each light source on the substrate, said pad having an optical reflectance less than that of the background layer and wherein said second layer is printed on top of said copper pad and on top of part of said background layer adjacent said pad.

14. An illuminated liquid crystal display apparatus as claimed in claim 12 wherein said second layer comprises a pattern of dots.

* * * * *